Figure 1:
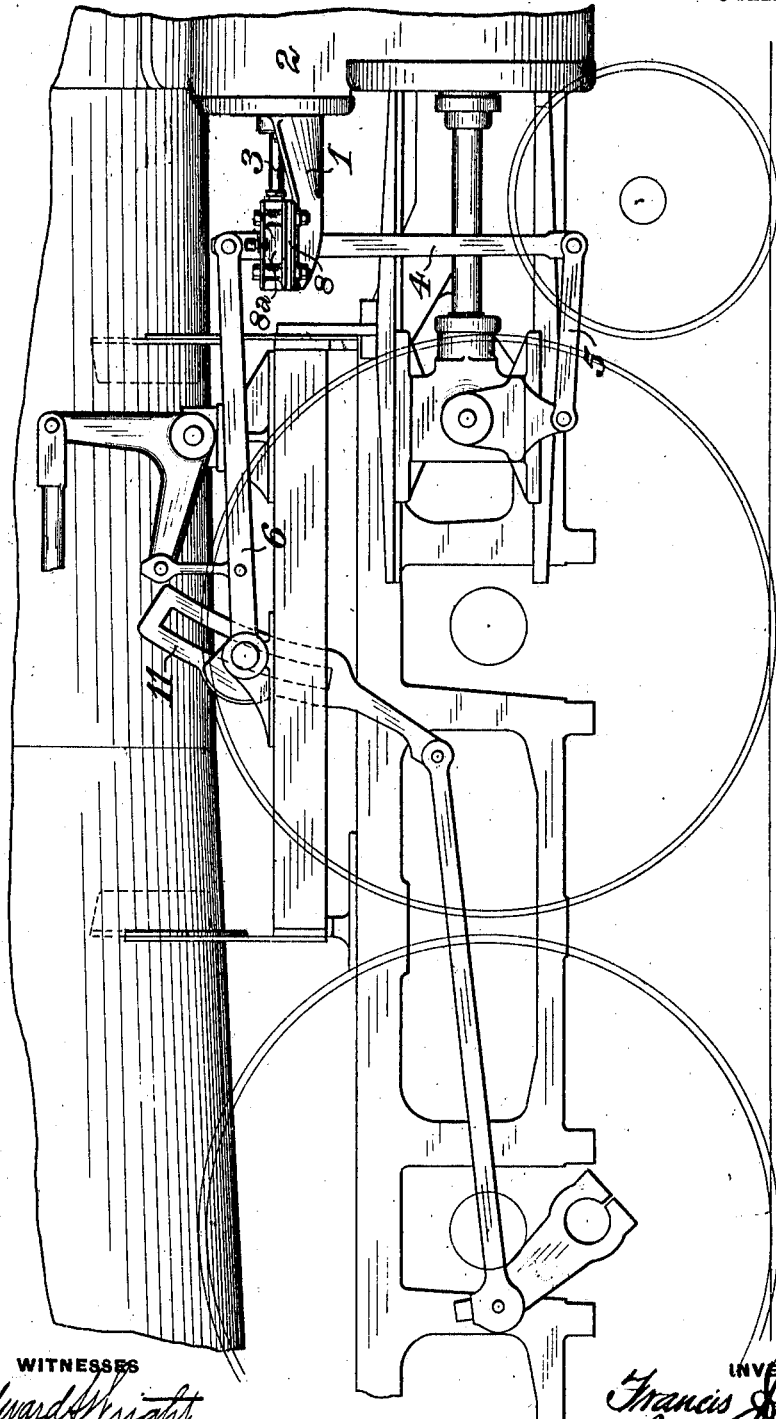

F. J. COLE.
VALVE STEM GUIDE FOR LOCOMOTIVES.
APPLICATION FILED DEC. 30, 1910.

993,651.

Patented May 30, 1911.

3 SHEETS—SHEET 1.

WITNESSES

INVENTOR

F. J. COLE.
VALVE STEM GUIDE FOR LOCOMOTIVES.
APPLICATION FILED DEC. 30, 1910.
993,651.
Patented May 30, 1911.
3 SHEETS—SHEET 2.
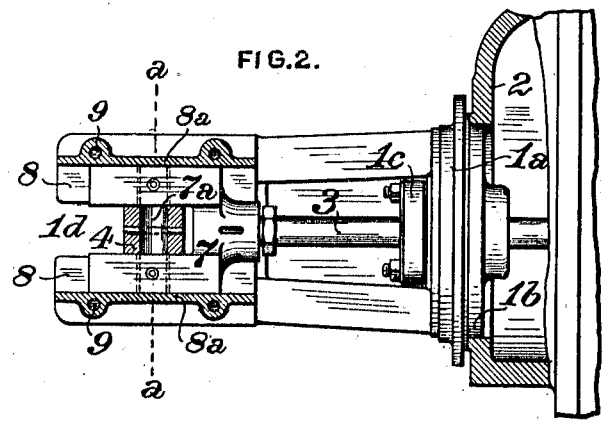
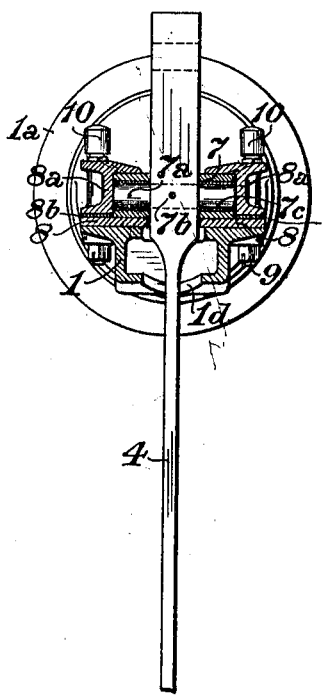
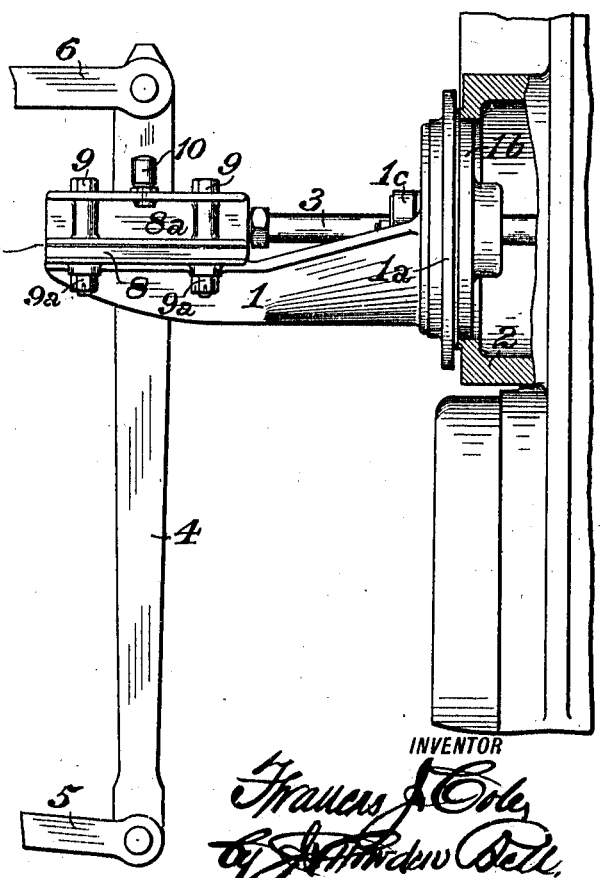

F. J. COLE.
VALVE STEM GUIDE FOR LOCOMOTIVES.
APPLICATION FILED DEC. 30, 1910.
993,651.
Patented May 30, 1911.
3 SHEETS—SHEET 3.
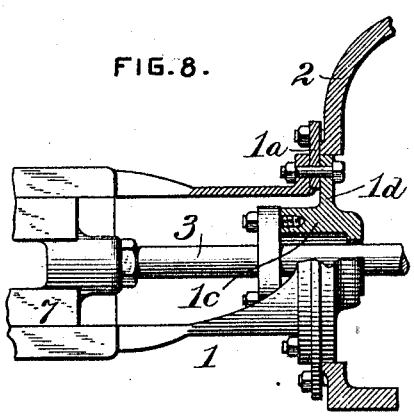
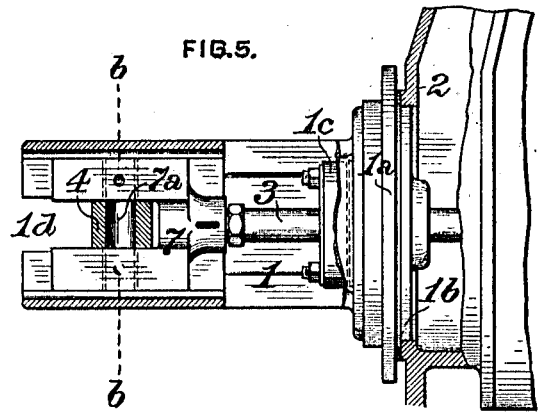
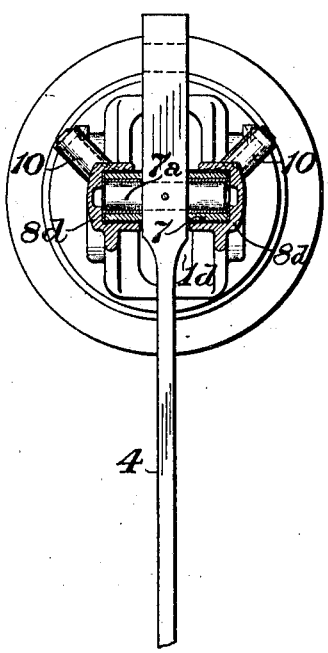
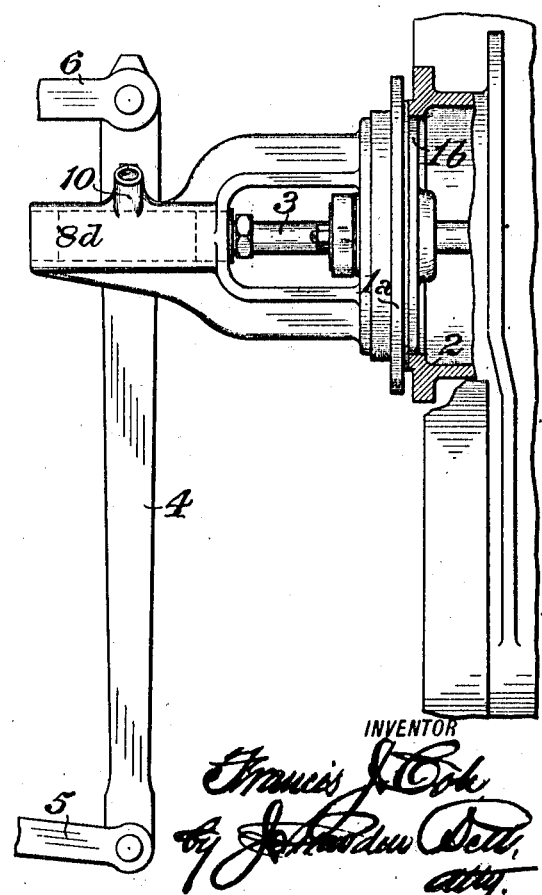
WITNESSES:
Edward Wright
S. R. Bell
INVENTOR
Francis J. Cole
by Johnston Bell
atty.

UNITED STATES PATENT OFFICE.

FRANCIS J. COLE, OF SCHENECTADY, NEW YORK.

VALVE-STEM GUIDE FOR LOCOMOTIVES.

993,651.      Specification of Letters Patent.      Patented May 30, 1911.

Application filed December 30, 1910. Serial No. 600,098.

*To all whom it may concern:*

Be it known that I, FRANCIS J. COLE, of Schenectady, in the county of Schenectady and State of New York, have invented a certain new and useful Improvement in Valve-Stem Guides for Locomotives, of which improvement the following is a specification.

The object of my invention is to provide means for guiding the valve stems of locomotive engines fitted with Walschaert or analogous outside valve gear, which shall be of simple and inexpensive construction and easy application and repair, shall be self centering, and shall admit of the employment of a straight combination lever and insure substantial lateral stability in said lever.

The improvement claimed is hereinafter fully set forth.

In the accompanying drawings: Figure 1 is a side view, in elevation, of so much of a locomotive engine as illustrates an application of my invention; Fig. 2, a plan or top view, partly in section and on an enlarged scale, of the valve stem guide; Fig. 3, a vertical transverse section, on the line $a\ a$ of Fig. 2; Fig. 4, a side view, in elevation; Fig. 5, a view, similar to Fig. 2, but illustrating a structural modification; Fig. 6, a vertical transverse section, on the line $b\ b$ of Fig. 5; Fig. 7, a side view, in elevation, of the structural modification shown in Figs. 5 and 6; and, Fig. 8, a plan view, partly in section, illustrating a further structural modification.

Referring first to Figs. 1 to 4 inclusive, in the practice of my invention, I provide a main body, or support, 1, having a head, $1^a$, on its forward end, which abuts against the rear end of the valve chest, 2, said head serving, in the instance shown, as the rear cap or closure of the valve chest, and being provided with an annular flange or projection, $1^b$, which is finished truly on its periphery and fits in a corresponding bore in the end of the valve chest, concentric with the valve stem, 3, upon which the distribution valve, which may be of any suitable known construction and is not herein shown, is secured. The guide is thereby centered in the valve chest, and the valve stem passes through a properly packed stuffing box, $1^c$, which may either be formed in the head, $1^a$, or, as shown in Fig. 8, in an independent valve chest cap, $1^d$, surrounded by said head and fitting in a bore in the valve chest concentric with the valve stem, similarly to the annular flange, $1^b$, above specified.

A longitudinal slot or recess, $1^d$, is formed centrally in the support, 1, at and extending inwardly from its rear end, for the passage of a combination lever, 4, which, as shown, is straight and not bifurcated at its ends, and is connected, at its opposite ends, to a combination link, 5, and to a radius bar, 6, extending to an ordinary Walschaert link, 11, or to a similarly operating member. The combination lever, 4, passes through a central slot in a cross head, 7, and is fitted on and adapted to rock about the axis of, a cross head pin, $7^a$, which presents a central bearing for the combination lever, and fits, on opposite sides thereof, in the jaws or side members of the cross head. The cross head, 7, is keyed on, or otherwise suitably secured to, the valve stem, 3. The cross head pin is preferably, as shown, secured to the combination lever, as by a pin, $7^b$, and adapted to rock, with the combination lever, in bearings in the cross head, formed by bushings, $7^c$, fixed therein. It will be obvious that, if preferred, the cross head pin may be fixed in the cross head and the combination lever journaled to rock on the fixed pin.

The cross head, 7, is adapted to reciprocate in guides which are detachably and adjustably connected to the support, 1, said guides comprising a pair of lower guide bars, 8, of plate form, and a pair of upper guide bars, $8^a$, of angle form, said upper and lower guide bars being secured to the support, 1, by bolts, 9, and nuts, $9^a$. Wear and lost motion between the cross head and guides may be taken up, as, from time to time, may become necessary or desirable, by means of detachable liners, $8^b$, interposed between the upper and lower guide bars, different thicknesses of which may be used as the conditions of wear may require. Oil cups, 10, are connected to the upper guide bars, for the purpose of enabling the cross head to be properly lubricated.

The structural modification shown in Figs. 5 to 7 inclusive, accords, in all essential particulars, with the construction above described, differing therefrom only in that the guides are, in this instance, in the form of longitudinal members, $8^d$, which are made integral with the support, 1, and are grooved or channeled to fit the jaws of the cross head, 7. This construction presents the advantage of being more simple than that first described, but lacks that of adjustability to compensate wear of the parts.

I claim as my invention and desire to secure by Letters Patent:

1. In a guide mechanism for the valve stem of a locomotive outside valve gear, the combination of a body or support, having an integral head on one end, adapted to abut against the valve chest, and a longitudinal central recess extending inwardly from its opposite end, lateral guide bars fixed to said support, and a cross head fitting movably between said guide bars, said cross head having a central slot for a valve gear combination lever and being adapted for end connection to a valve stem.

2. In a guide mechanism for the valve stem of a locomotive outside valve gear, the combination of a body or support, having, on one end, an integral head, adapted to abut against a valve chest and provided with an annular projection for centering the support in the valve chest, and having a longitudinal central recess extending inwardly from its opposite end, lateral guide bars fixed to said support, and a cross head fitting movably between said guide bars, said cross head having a central slot for a valve gear combination lever and being adapted for end connection to a valve stem.

3. In a guide mechanism for the valve stem of a locomotive outside valve gear, the combination of a body or support, having an integral head on one end, adapted to abut against a valve chest, and a longitudinal central recess extending inwardly from its opposite end, lateral guide bars fixed to said support, a cross head fitting movably between said guide bars, said cross head having a central slot for a valve gear combination lever and being adapted for end connection to a valve stem, and detachable liners interposed between the cross head and guide bars.

4. In a guide mechanism for the valve stem of a locomotive outside valve gear, the combination of a body or support having an integral head on one end, adapted to abut against a valve chest, and a longitudinal central recess extending inwardly from its opposite end, lateral guide bars fixed to said support, a cross head fitting movably between said guide bars, said cross head having a central slot for a valve gear combination lever and being adapted for end connection to a valve stem, and a pin fitting in bearings in the sides of the cross head and having an intermediate bearing for a combination lever.

5. In a guide mechanism for the valve stem of a locomotive outside valve gear, the combination of a body or support having an integral head on one end, adapted to abut against a valve chest, and a longitudinal central recess extending inwardly from its opposite end, lateral guide bars fixed to said support, a cross head fitting movably between said guide bars, said cross head having a central slot for a valve gear combination lever and being adapted for end connection to a valve stem, a pin fitted to rock in bearings in the sides of the cross head, and a combination lever fixed upon said pin between the bearings thereof.

6. In a guide mechanism for the valve stem of a locomotive outside valve gear, the combination of a body or support having an integral head on one end, adapted to abut against a valve chest, and a longitudinal central recess extending inwardly from its opposite end, upper and lower lateral guide bars adjustably connected to said support on opposite sides of the central recess thereof, and means for adjusting said guide bars toward and from each other.

FRANCIS J. COLE.

Witnesses:
S. W. TYLER,
JOSHUA J. JONES.